(12) United States Patent
Sarangi

(10) Patent No.: US 9,483,777 B2
(45) Date of Patent: Nov. 1, 2016

(54) CONTENT DISPLAY ON MOVING VEHICLES

(71) Applicant: Ananda Sarangi, Beaverton, OR (US)

(72) Inventor: Ananda Sarangi, Beaverton, OR (US)

(\*) Notice: Subject to any disclaimer, the term of this patent is extended or adjusted under 35 U.S.C. 154(b) by 0 days.

(21) Appl. No.: 14/313,791

(22) Filed: Jun. 24, 2014

(65) Prior Publication Data

US 2014/0379475 A1      Dec. 25, 2014

Related U.S. Application Data

(60) Provisional application No. 61/957,072, filed on Jun. 24, 2013.

(51) Int. Cl.
| | | |
|---|---|---|
| *G05D 1/00* | (2006.01) | |
| *G06Q 30/02* | (2012.01) | |
| *G09F 21/04* | (2006.01) | |
| *G09F 7/18* | (2006.01) | |

(52) U.S. Cl.
CPC ........... *G06Q 30/0266* (2013.01); *G09F 21/04* (2013.01); *G09F 2007/1895* (2013.01)

(58) Field of Classification Search
CPC ...... G06Q 30/02; G06Q 30/00; G09F 21/04; B60Q 1/00; B60Q 1/54; G06F 17/00
USPC ....... 701/1, 2, 36, 410; 340/425.5, 466, 468, 340/468.1, 691.6, 932.2; 455/456.3; 705/14.55, 14.56, 14.62, 14.63, 35; 709/26, 203
See application file for complete search history.

(56) References Cited

U.S. PATENT DOCUMENTS

| | | | | |
|---|---|---|---|---|
| 8,340,726 | B1 * | 12/2012 | Fujisaki ........................ 455/566 |
| 2003/0132295 | A1 * | 7/2003 | Messina ........................ 235/384 |
| 2006/0213100 | A1 * | 9/2006 | McCann ........................ 40/591 |
| 2009/0299857 | A1 * | 12/2009 | Brubaker ................... 705/14.66 |
| 2010/0179878 | A1 * | 7/2010 | Dawson et al. ............ 705/14.62 |
| 2011/0295697 | A1 * | 12/2011 | Boston et al. ............. 705/14.68 |
| 2012/0327575 | A1 * | 12/2012 | Eiland ...................... 361/679.01 |
| 2013/0006775 | A1 * | 1/2013 | Jordan et al. .............. 705/14.62 |
| 2013/0097900 | A1 * | 4/2013 | Rousey et al. ................. 40/209 |
| 2014/0033585 | A1 * | 2/2014 | Harrell ........................... 40/209 |
| 2014/0070963 | A1 * | 3/2014 | DeLorean .................... 340/917 |
| 2014/0114764 | A1 * | 4/2014 | Mendoza ................... 705/14.62 |

FOREIGN PATENT DOCUMENTS

DE      2723310      * 7/1977

OTHER PUBLICATIONS

Najafi et al. Regularization Function for Video Super-Resolution Using Auxiliary High Resolution Still Images, 2012, IEEE, p. 1713-1717.*
Chen et al. Extraction of High-Resolution Video Stills from MPEG Image Sequences, 1998, IEEE, p. 465-469.*
Shukor et al., An Automated Remote Messaging System using GSM Communications, IEEE, 2009, p. 11-14.*
Chen et al. Vision Based Distance Estimation for Multiple Vehicles Using Single Optical Camera Feature, IEEE, 2011, p. 9-12.*

\* cited by examiner

*Primary Examiner* — McDieunel Marc
(74) *Attorney, Agent, or Firm* — Klarquist Sparkman, LLP

(57) ABSTRACT

Systems and methods are provided for displaying content on a vehicle with at least one display device coupled to a frame member and extending to the right or left of the license plate receiving area of the vehicle. Content is selected and altered as desired, including based on user preferences and/or vehicle location.

13 Claims, 4 Drawing Sheets

CONTENT DISPLAY ON MOVING VEHICLES

CROSS REFERENCE TO RELATED APPLICATION

This application claims the benefit of U.S. Provisional Application No. 61/957,072 filed Jun. 24, 2013, which is herein incorporated by reference in its entirety.

FIELD

This disclosure is related to methods and systems for managing and displaying content on a moving vehicle.

BACKGROUND

For an advertiser, visibility of your message is paramount. Currently, most advertisements are static displays of messages either on a billboard or some other structure. Such messages, however, are limited in their visibility because they can only be viewed by persons that pass by those structures. When advertising messages are displayed on moving objects, such as buses and other commercial vehicles, those advertisements are generally static images attached to the vehicle. As such, advertisements attached to such vehicles are not easily altered. Accordingly, there is a need for a system for displaying information on moving vehicles and controlling the content of the display so such displays are readily adaptable to changing content.

SUMMARY

In one embodiment, a system for displaying content on a vehicle is provided. The system comprises a frame member configured to be mounted on the vehicle at or adjacent to a license plate receiving area of the vehicle, at least one display device coupled to the frame member and extending to the right or left of the license plate receiving area of the vehicle, and a plurality of mounting members for mounting the frame member to the vehicle at or adjacent to the license plate receiving area.

In some embodiments, the at least one display device extends to the right of the license plate receiving area, to the left of the license plate receiving area, or both (with two displays, either linked or separately functioning). The plurality of mounting members can secure the frame member to the vehicle such that unauthorized removal of the frame member from the vehicle will damage the system.

The display device comprises a high resolution video display that can display static and dynamic image content. The system can also include a memory device for receiving and storing content that can be displayed on the at least one display device. The memory device can be internal to the system and/or removable such that content can be delivered to the memory device with the memory device external to the system. The display device can transmit to and receive information from the cloud computing regarding content, content management, and device configuration using any wireless technology or through a direct connection to a computing network and that information can be provided to the memory, either remotely from the system if the memory is removable or directly to the system if the memory is fixed or otherwise installed in the system.

The system can also comprise a wireless receiver for receiving content information that can be stored in the memory device. In some embodiments, the system can comprise a standalone secured wireless transmission capability to communicate with a cloud computing environment or with a computer network using an established wireless communication standard (or other proprietary technology) to manage user account information, content management, and coordinate the delivery and display of the selected content.

In another embodiment, a method for enabling the display of content on a moving vehicle is provided. The method can include providing a plurality of display systems to a plurality of users, each of the display systems having a display device and being mountable, respectively, to a vehicle of each user at or adjacent to a license plate receiving area of the vehicle. The method can further include delivering content to the respective display systems for display on the respective display device of those display systems and receiving display information about the display of the content delivered to each of the respective display systems and providing a fee to each user based on the received display information.

In some embodiments, the content that is delivered to the respective display systems is user selected. The users can be registered and select the content for display, such that the method further can include receiving registration information at a remote website from each user, and receiving content selection information from each registered user about the content to be delivered to the user's respective display system. In some embodiments, each user's vehicle is linked to the registration information of a user.

The delivered content can include media files with advertising content and display instructions, with the display instructions comprising instructions relating to the manner in which the advertising content is displayed. The content that is delivered to a respective display systems can be selected based on an identified geographic location of the user's vehicle. In addition, the display information can include information about content that was displayed while the vehicle was moving and content that was displayed while the vehicle was not moving. The display instructions can also comprise information about the time and duration in which the delivered content is to be displayed.

In some embodiments, location-based information can be received from a respective display system and content delivered to the respective display system can be based on the received location-based information. Location-based information can also be received from respective display systems to determine whether the vehicle is moving or not and selecting the content that is to be displayed based on that determination.

The foregoing and other objects, features, and advantages of the invention will become more apparent from the following detailed description, which proceeds with reference to the accompanying figures.

DETAILED DESCRIPTION

General Considerations

Figure 1:
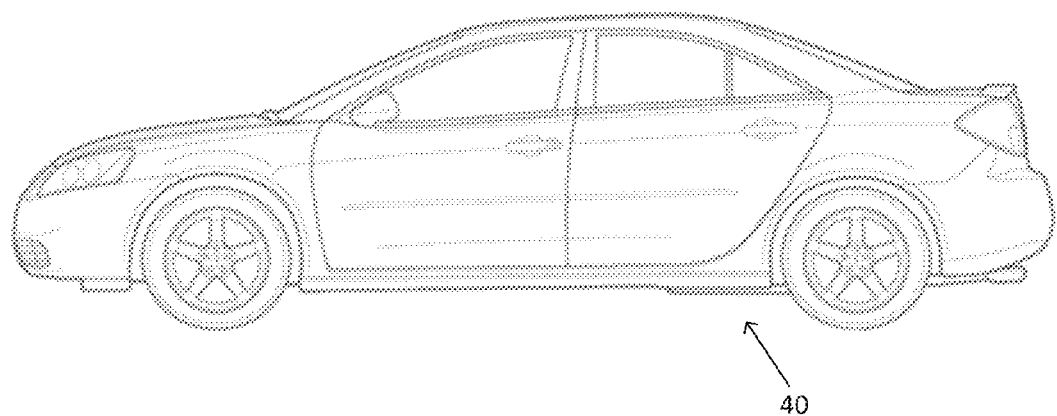
FIG. 1 illustrates a side view of an exemplary vehicle to which a display can be attached.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level abstractions of the actual operations that are performed. The actual operations that correspond to these terms may vary depending on the particular implementation and are readily discernible by one of ordinary skill in the art.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means mechanically, chemically, electrically, or otherwise coupled or linked and does not exclude the presence of intermediate elements between the coupled or associated items absent specific contrary language.

Display Device for Use with Moving Vehicles

As disclosed herein, a display system 10 can comprises a display device 20 positioned adjacent the license plate 30 of a moving object (e.g., vehicle 40). The display system 10 can be physically attached or mounted to the body of the moving object. The display device 20 can have its own power source, such as rechargeable battery, solar cells or can be connected directly to the power source of the vehicle or by other methods—such as wind power, fuel cells, hydropower by which it can be powered.

The display device 20 is preferably a low power device, such as a LED/OLED or LCD display, or an e-ink/EPD/iMoD/TFT display, carbon nanotube display, or any display device made from solid state components or by fabricating semiconductor components and integrating those components discreetly to the size of the display device or any other display type with low power, high contrast and wide angle viewing characteristics. The display device 20 can be high or low resolution device, and its dimension in any given direction can range from less than an inch to 200 ft.

The display device 20 can be either black and white, monochromatic, or of color schemes that support more than one color pallet. In some embodiments, the display device 20 can include a backlight or frontlight whose intensity can be changeable based on mode of operation of the display device or time of the day. The backlight can be located along the periphery of the display device 20 or can be placed and distributed along anywhere behind the surface of display device 20. The backlight can include any type of light source, in any color, in series, in parallel or in any other arrangements. The light source can be stand-alone LED elements or a light reflective surface with a separate light source or combination of thereof.

A frontlight can comprise any lighting system for illuminating the display device, usually a liquid crystal display (LCD) or electronic paper display (EPD), which would otherwise be viewed in ambient light. This improves its performance in poor lighting conditions and in nighttime viewing. For example, an unilluminated LCD and EPD can be lit from the front. With LCD and EPD, the liquid crystal itself is sandwiched between a polarization filter and a reflective surface to make use of ambient light. Thus, the mirror makes the display opaque so it cannot generally be illuminated from the back. In these instances, and other instances where frontlighting is useful, a light source can be placed around the perimeter of the LCD and EPD. The frontlighting can be directed towards the front surface of the display and can utilize similar light sources (e.g., colored, LED, etc.) to those discussed above with backlighting.

In some embodiments, the moving object on which the display will be mounted can comprise a manual powered cart, trolley, bicycle, rickshaw, pedi-cab, or any object with one or more wheels. In other embodiments, the moving object can comprise an automobile of any size whose moving energy can be derived from organic, inorganic, hydrocarbon, mechanical, electrical, hydro, solar, wind, sound, light, heat, or gaseous substance or source directly or in combination of the sources mentioned above or it can be manually operated. The display device 20 can be housed or mounted anywhere either on the exterior or in the interior surface of the moving object such that it is visible if an attempt is made to view it. The moving object can be seaborne, airborne or surface borne or it can hover between surfaces.

Figure 2:
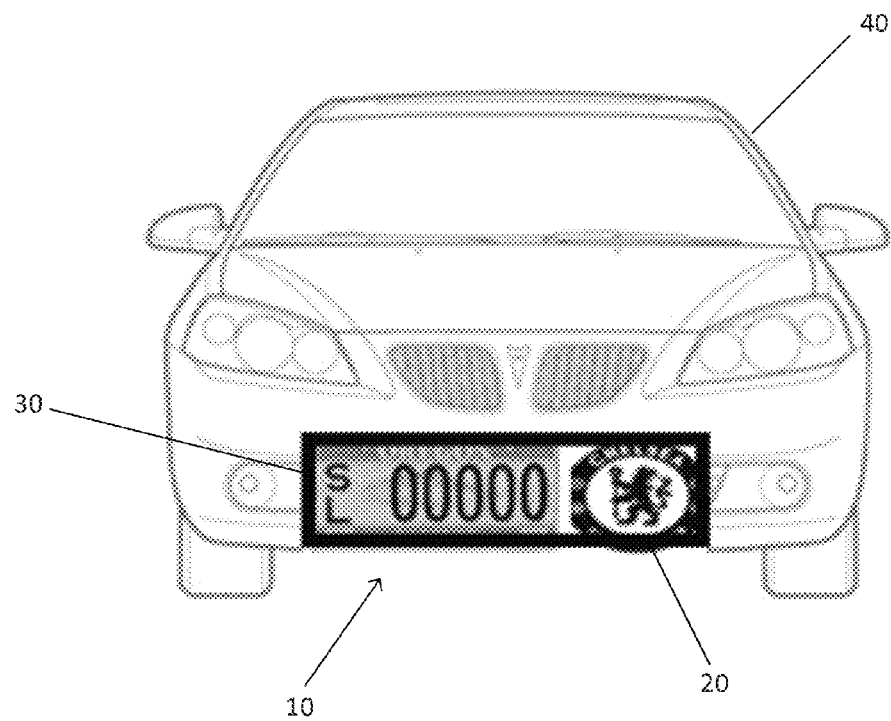
FIG. 2 illustrates a front view of the vehicle of FIG. 1, shown with an exemplary display adjacent to the front license plate of the vehicle.

In embodiments where the moving object is a motor vehicle as shown in FIG. 1, then the display system 10 can be physically with a license plate of the vehicle, as shown in FIG. 2, to receive and display contents wirelessly. As shown in FIGS. 2 and 2, display systems 10 can be coupled to the moving object at either, or both, the front (FIG. 2) or back (FIG. 3) license plate of the vehicle. As will be understood by one of ordinary skill in the art, display system can be coupled to the vehicle in various manners. Preferably, display system 10 cannot be easily separated in an unauthorized manner without destructing or damaging the license plate or the display device 20, or both items.

Figure 4:
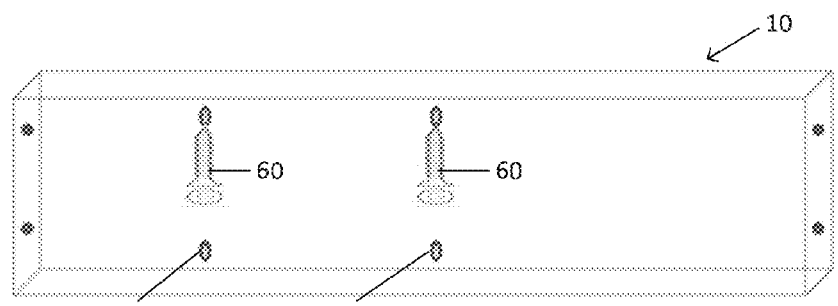
FIG. 4 illustrates an exemplary display system which can be attached to a license plate mount of a vehicle.
Figure 5:
FIG. 5 illustrates an exemplary display system which can be attached to a vehicle.

FIGS. 4 and 5 illustrate alternative embodiments of display system 10 that allow display system 10 to be mounted to a vehicle. For example, FIG. 4 illustrates an embodiment in which mounting holes 50 are provided and generally aligned with mounting holes in the vehicle for receiving a license plate. By this arrangement, a single set of fasteners (e.g., screws 60) can secure both the license plate and display system to the vehicle. Alternatively, as shown in FIG. 5, the display system can be coupled to the vehicle separately from the mounting holes provided in the vehicle for receiving a license plate. In FIG. 5, the mounting holes 50 are illustrated on the sides of display system 10. It should be understood that various mounting types (fasteners) can be provided at various locations on the display system.

Figure 3:
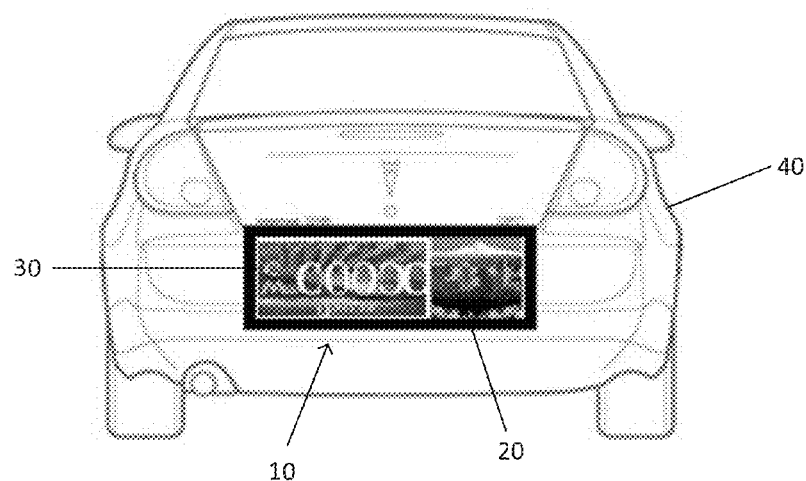
FIG. 3 illustrates a rear view of the vehicle of FIG. 1, shown with an exemplary display adjacent to the rear license plate of the vehicle.
Figure 6:
FIG. 6 illustrates an exemplary display system that presents a display device adjacent a license plate.
Figure 7:
FIG. 7 illustrates another exemplary display system that presents a display device adjacent a license plate.
Figure 8:
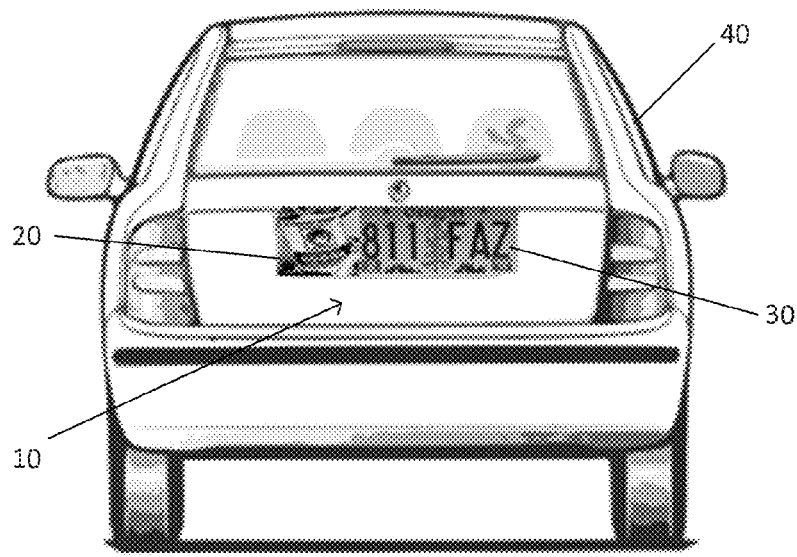
FIG. 8 illustrates the display system of FIG. 7 coupled to a vehicle.
Figure 9:
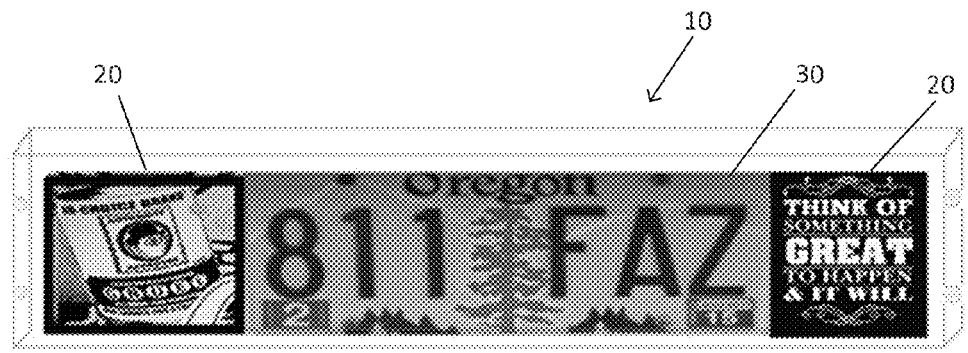
FIG. 9 illustrates another exemplary display system that presents a pair of display device adjacent a license plate.
Figure 10:
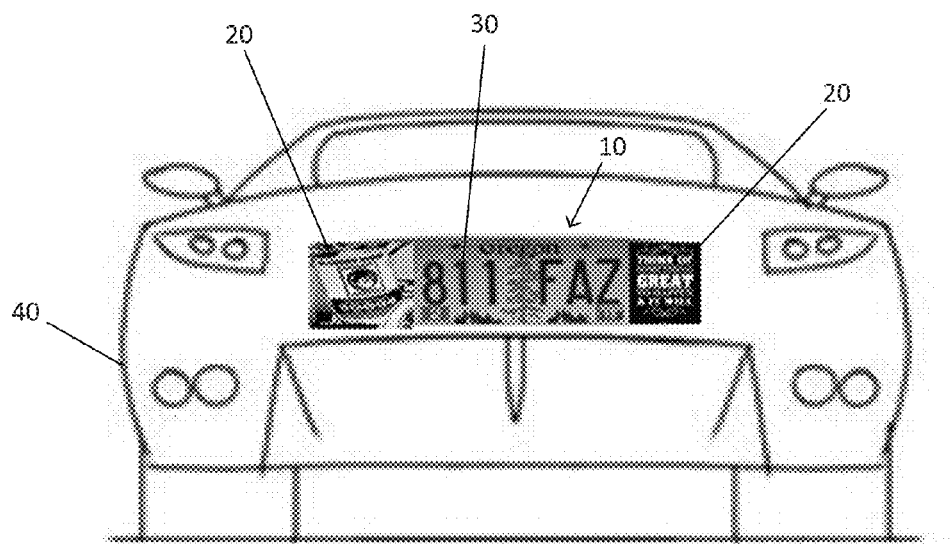
FIG. 10 illustrates the display system of FIG. 10 coupled to a vehicle.

In addition, it should be noted that display system 10 can comprise display devices 20 on one or both sides of the license plate. For example, FIGS. 3 and 6 illustrates display devices 20 on the right side of a license plate, FIGS. 7 and 8 illustrate the display devices 20 on the left side of the license plate, and FIGS. 9 and 10 illustrate display devices 20 on both sides of the license plate.

In some embodiments, the display system can be structurally integrated with the license plate and or license plate frame. Structural integration of the display system with the vehicle and/or vehicle license plate can allow the display device to be weatherproof and/or provide some protection against crash and accidental damages. In some embodiments, the display device can also be associated with a particular vehicle. For example, each display device can have unique identification number or serial number, and these numbers can be associated with a particular vehicle (either by associating the display with the license plate of the vehicle or some other unique aspect of the vehicle (e.g., VIN).

Methods and Systems for Managing and Displaying Content

The display devices disclosed herein can be configured to receive any type of display content that can be presented on a screen. The content can include dynamic or static images, or both, and can be displayed on the display device when the vehicle is at rest and/or when the vehicle (or other object that receives the display device) is moving.

The content that is to be displayed on the device can be user selected. In some embodiments, the user selects the display contents from a cloud computing environment and stores the content in a memory associated with the device. The memory device can comprises any conventional memory device capable of storing the content that can be delivered to the display device. The memory device can be removable or non-removable.

When the memory device is in connected to or in communication with the display device, the system can display content from the memory device for certain amount of duration according to timing information embedded in the content or otherwise directed by software associated with the display system. As will be understood herein, a memory device can be connected to or in communication with the display system if it is physically coupled to the system or wirelessly coupled to the system, such as by BLUETOOTH™ or some other wireless standard. In specific implementations, the system can be configured so that the display continuously displays content using the next content in the memory device. If the system cycles through all content in the memory device, the process can be repeated.

Preferably, the display of content is determined, at least in part, based on a movement of the vehicle. For example, in some embodiments, the display of content can be different when the vehicle is at rest than it is when the vehicle is moving. This distinction can be useful when the displayed content comprises advertising content that is move advantageously displayed when the vehicle is moving (i.e., generating more views) than it is when the vehicle is not moving.

The system can store a detailed log in the memory device regarding which content was displayed and the duration the content was displayed when the vehicle was moving, when the vehicle was stopped, or both when the vehicle was moving and stopped.

In some embodiments, when the vehicle is no longer moving a default content can be displayed. The default content can also be user selectable and there can be more than one default content in the memory device for displaying with the display device. Determination of the moving state of the vehicle can be achieved in a variety of manners. For example, in some implementations, the vehicle can be considered to be in a moving state, if its ignition is on and the wheels are not stationary or its location changes over a predetermined time intervals and its speed sensor generates data.

In some embodiments, a central database can maintained (e.g., in a cloud computing environment) to store display contents and for the account keeping of contents that have been transferred to the memory device by the user. The user account in regards to the contents that user displayed while the vehicle was moving is updated when the memory device is reconnected to the cloud computing.

Content and related information can be delivered directly to the system—either while stationary or while moving—or it can be delivered to an external device (e.g., a removable memory) which can then be coupled with the system to provide the system with the received content. Thus, content information from the cloud computing can be communicated to the display device either by attaching a removable memory device with the content or by wireless communication directly from the cloud computing to the display device's storage. Wireless communication can be implemented in any suitable manner, including for example using industry standard IEEE 802.11 b/g/n, through a commercial cellular wireless network, or through a secured local area network. If content is transferred to the display device wirelessly then the account keeping of the contents in the context of what content was displayed when the vehicle was moving and the duration it was displayed can also be transferred to cloud computing through wireless communication from the display device.

Location-based information can also be acquired from the system to either select and receive content for delivery to the system, and to determine the state of the vehicle during display of the content. Thus, for example, the system can utilize any manner of location determination, such as by equipping the system with GPS, to identify location and/or movement of the vehicle.

In some embodiments, the content that is displayed is selected for display at certain locations and/or times. The location/time sensitive content can be retrieved and stored in memory for use at the desired location/time. Thus, for example, a location trigger can be provided that selects the display information based on a determined location of the vehicle. Similarly, the system can begin or end the display of certain content based on some timing trigger (e.g., an internal clock mechanism).

In some embodiments, the location/time sensitive content can be retrieved by the system at a particular location. For example, the receipt of content can be triggered by the presence and the proximity of the display device to a trigger device at a select location that could trigger this event. The trigger mechanism can be implemented by a pair of radio-frequency (RF) tags, where each tag can be a transceiver, a transmitter or a receiver. If a display device with a RF tag comes in proximity where content loading is authorized and a RF transmitter is present, the RF tag in the display device will enable its communication circuits (such as Wi-Fi receiver) and the content loading to the display device will start at the selected location and its completion will be notified to the display when the process is complete. Once the content loading is complete, display device will start displaying the content according to the properties embedded.

Thus, location can be determined and used to coordinate the delivery of location-specific content for display on the vehicle. In addition, changes in location can be used to determine whether the vehicle is moving during the display of particular content and the distances that the vehicle has traveled during the display (and speeds traveled, if desired). Thus, for example, by tracking distances (and speeds), the system can more accurately prescribe value to a particular vehicle's display of content. In this manner, display of content in a slow moving traffic jam can be distinguished from the display of content while engaging in normal city or highway driving.

The display system is preferably configured such that its owner can control and enable or disable the display content. Thus, for example, an owner can preferably control whether the vehicle can display content at any particular time (display function on/off), as well as control either the specific content for display (content selection) or the type of content (content type selection) that can be displayed at any given time.

The content for display on the display system can be stored in a variety of formats, including, for example, text files, image files, bitmap files, raw data files, or any combination of those formats. The file can be either an encrypted or non-encrypted type. If the file is an encrypted type then only a registered user can have access to it in the cloud computing environment. In addition, the display content can be vehicle and time restricted such that only a registered display device can display the content for the duration of time according to the display time information embedded in the content file.

As discussed above, the images and/or content of the display can comprise advertising information. Alternatively, the images and/or content can be used to display other helpful information relating to the occupant or vehicle. In some embodiments, the displayed information can comprise information relating to authorizations relating to the vehicle itself, such as receipt of toll payment, parking authorization, digital, optical, graphical, textual or visual information as authorization for the vehicle to enter certain structure, compound or road system or pass through non land area in certain section of the display in addition to the user selected display content.

In some embodiments, in addition to the basic display information in the file, the file may contain other properties and/or values embedded into the file. For example, properties such as (1) how frequent the content will be displayed, (2) the duration the content will be displayed, (3) what time of the day it will be displayed, (4) what sequence of contents will be displayed before and after certain content, (5) what particular content will be displayed when the display is at selected spot, and (6) certain specific display environmental properties such as contrast, brightness, amount of backlight and/or frontlight to turn on can be embedded in the content file (individually, or in any combination). Certain user specific properties can also be included with the content file such as content type, sequence, durations, and other relevant information that will apply to a user or vary from user to user when that content is displayed by the display device. Certain properties of the contents prior to display can be modified by the user in the cloud computing system environment. The display device can be configured to identify and interpret the modified properties before the contents are displayed.

A registered subscriber can purchase the display system and, as discussed above, can select the content for display. Preferably, the selection is from a remote system such as a website that provides content management and control. In operation, the use can choose to display certain content. If that content is advertising content, the user can display that content and receive a fee based on the amount of time the content is displayed on the motor vehicle.

If the system has default content that is displayed when the vehicle is at rest and other advertising content that is displayed when the vehicle is moving, the fee paid to the user can vary based on the type of content displayed. For example, content that is displayed as a static (default content) can have lower monetary value compared to the content that is displayed while the vehicle is not stationary. Additionally, content can have a different monetary value depending on the time of the day it was displayed, how long it was displayed, how often it was displayed and also be based on the subscriber's zip code so the cost of content delivery across geography is embedded in the revenue generation model.

There can also be premier content, which will have higher order of monetary value, if that referenced content triggers a successful transaction in the echo system. This process will allow a higher order of revenue stream which will be shared with the subscriber so that the same subscriber (ad displayer) will have further motivations to display certain ads and additional ads at certain location and at certain time. Also, there could be certain number of contents available in one region that may not be available in other region and the monetary value of the content may depend on the quantity of the content available for displaying on the display device.

In some embodiments, instead of being mounted externally on a vehicle, the display device can be mounted internally in a vehicle. For example, in a vehicle that receives persons for transportation (e.g., bus, cab, train), the display can be positioned on a back of a seat, on the wall, on the ceiling, or any other surface visible to the passengers of the vehicle. In such embodiments, the system can generally function similarly to the system described for external attachment, except that there is no license plate receiving area and the frame member would simply be configured for attachment to the particular internal surface.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A system for displaying content on a vehicle, the system comprising:
a frame member configured to be mounted on the vehicle at or adjacent to a license plate receiving area of the vehicle;
at least one display device coupled to the frame member and adaptable to display changing image content, the at least one display device extending to the right or left of the license plate receiving area of the vehicle and having a power source to power the display;
at least one sensor configured to receive information about a condition of the vehicle; and
a plurality of mounting members for mounting the frame member to the vehicle at or adjacent to the license plate receiving area,
wherein the image content display by the at least one display device can be altered based on the information received by the at least one sensor.

2. The system of claim 1, wherein the at least one display device extends to the right of the license plate receiving area or the left of the license plate receiving area, or has at least two displays that extend, respectively, to the right and the left of the license plate receiving area.

3. The system of claim 1, wherein the plurality of mounting members secure the frame member to the vehicle such that unauthorized removal of the frame member from the vehicle will damage the system.

4. The system of claim 1, wherein the at least one display device comprises a high resolution video display that can display static and dynamic image content.

5. The system of claim 1, wherein the system comprises a memory device for receiving and storing content that can be displayed on the at least one display device, the memory device being either integral to the system or removable.

6. The system of claim 5, wherein the system comprises a wireless receiver configured to receive content information that can be stored in the memory device.

7. The system of claim 1, wherein the at least one sensor comprises a GPS device.

8. The system of claim 1, wherein the at least one sensor comprises a speed sensor.

9. The system of claim 1, wherein the at least one sensor is configured to determine whether the vehicle is moving or stationary.

10. The system of claim 1, further comprising a memory device configured to receive and store information about the content displayed by the display device.

11. The system of claim 1, wherein the information received by the at least one sensor comprises geographical location information and the image content displayed by the at least one display device is selected based on the geographical location information.

12. The system of claim 1, wherein the information received by the at least one sensor comprises light intensity information.

13. The system of claim 1, further comprising a light sensor configured to receive information about ambient light and alter the light intensity of the display based on the received ambient light information.

* * * * *